United States Patent
Renollett (10) Patent No.: US 10,704,716 B2
(45) Date of Patent: Jul. 7, 2020

(54) END CONNECTOR WITH OFFSET CROSS-HOLE

(71) Applicant: TESCOM CORPORATION, Elk River, MN (US)

(72) Inventor: Jacob T. R. Renollett, Andover, MN (US)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 15/199,747

(22) Filed: Jun. 30, 2016

(65) Prior Publication Data

US 2018/0003328 A1 Jan. 4, 2018

(51) Int. Cl.
*F16L 25/14* (2006.01)
*F16L 23/032* (2006.01)

(52) U.S. Cl.
CPC .............. *F16L 25/14* (2013.01); *F16L 23/032* (2013.01)

(58) Field of Classification Search
CPC ......... F16L 55/07; F16L 25/14; F16L 23/024; F16L 23/032
USPC ........................................................ 251/148
See application file for complete search history.

(56) References Cited

U.S. PATENT DOCUMENTS

| 1,546,939 | A | * | 7/1925 | Otis | F16L 23/006 285/412 |
| 4,610,471 | A | * | 9/1986 | Halen | F16L 47/14 285/148.13 |
| 5,474,351 | A | * | 12/1995 | Ligh | F16L 41/02 285/120.1 |
| 7,047,908 | B2 | * | 5/2006 | Henderson | B08B 7/0007 122/395 |
| 7,562,913 | B1 | * | 7/2009 | Metzger | F16L 23/026 285/412 |
| 2004/0003845 | A1 | * | 1/2004 | Biszko | F17D 1/02 137/269 |
| 2004/0245771 | A1 | * | 12/2004 | Tempas | F16L 19/0218 285/148.27 |

* cited by examiner

*Primary Examiner* — Angelisa L. Hicks
(74) *Attorney, Agent, or Firm* — Marshall, Gerstein & Borun LLP (57) ABSTRACT

An end connector for connecting a fluid pipeline to a fluid flow control device. The end connector includes a body adapted to engage an external surface of the fluid flow control device, and a plurality of bolt holes formed through the body and adapted to receive a plurality of bolts, respectively, to couple the body to the fluid flow control device. The end connector also includes a cross-hole formed through at least a portion of the body and adapted to carry fluid between the fluid pipeline and the fluid flow control device. The bolt holes are circumferentially arranged around a central axis of the body, and the cross-hole is centered about an axis offset from the central axis of the body.

20 Claims, 5 Drawing Sheets

END CONNECTOR WITH OFFSET CROSS-HOLE

FIELD OF THE DISCLOSURE

The present disclosure generally relates to an end connector for a fluid flow control device, and, more particularly, to an end connector having an offset cross-hole that minimizes axial forces on the end connector.

BACKGROUND

Process control systems, such as distributed or scalable process control systems commonly found in chemical, petroleum or other industrial processes, typically include one or more process controllers communicatively coupled to one or more field devices via analog, digital, or combined analog/digital buses. The field devices may include, for example, fluid flow control devices (e.g., control valves, pressure regulators) valve positioners, switches, and transmitters (e.g., temperature, pressure and flow rate sensors). The field devices perform functions within the process such as opening or closing valves, measuring process parameters, and performing basic diagnostics. The process controller receives signals indicative of process measurements made by the field devices, or may receive other information pertaining to the operation or status of the field devices. The process controller then uses this information to execute or implement one or more control routines to generate control signals, which are sent over the buses to the field devices to control the operation of the process. Information from each of the field devices and the controller is typically made available to one or more applications executed by one or more other hardware devices, such as host or user workstations, personal computers or computing devices. In turn, such applications enable an operator to perform any desired function regarding the process, such as setting parameters for the process, viewing the current state of the process, modifying the operation of the process, or other desired functions.

Figure 1:
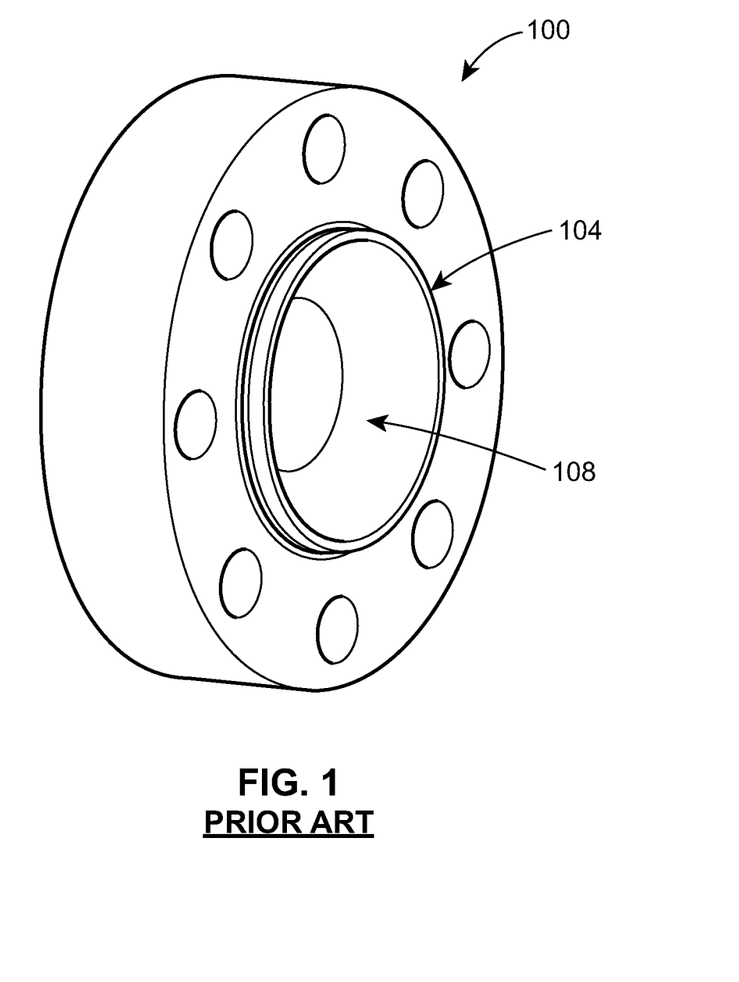
FIG. 1 is a perspective view of a conventional end connector that can be utilized to connect a fluid flow control device to a fluid flow pipeline.

Fluid flow control devices are typically connected to other components of a process control system using end connectors such as the end connector 100 illustrated in FIG. 1. The end connector 100 shown in FIG. 1 has a cross-hole 104 and a fluid port 108 that is aligned with the cross-hole 104. When the end connector 100 is coupled to a fluid flow control device (not shown), the cross-hole 104 and the fluid port 108 facilitate fluid flow between the fluid flow control device and an upstream or downstream pipeline, thereby fluidly connecting the fluid flow control device to one or more other components of the process control system.

For ease of manufacturing and assembly, identical end connectors 100 are typically utilized to connect the inlet and the outlet of the fluid flow control device to upstream and downstream pipelines, respectively. The cross-hole 104 and the fluid port 108 of the end connector 100 are thus centrally located, such that the cross-hole 104 and the fluid port 108 of the inlet end connector 100 are aligned with the cross-hole 104 and the fluid port 108 of the outlet end connector 100. In other words, the cross-hole 104 of the inlet end connector 100 is centered about the same axis as the cross-hole 104 of the outlet end connector 100, while the fluid port 108 of the inlet end connector 100 is centered about the same axis as the fluid port 108 of the outlet end connector 100 (and the same axis as the cross-holes 104 of the inlet and outlet end connectors 100).

SUMMARY

In accordance with a first exemplary aspect, an end connector is provided for connecting a fluid pipeline to a fluid flow control device. The end connector includes a body adapted to engage an external surface of the fluid flow control device, and a plurality of bolt holes formed through the body and adapted to receive a plurality of bolts, respectively, to couple the body to the fluid flow control device. The end connector also includes a cross-hole formed through at least a portion of the body and adapted to carry fluid between the fluid pipeline and the fluid flow control device. The bolt holes are circumferentially arranged around a central axis of the body, and the cross-hole is centered about an axis offset from the central axis of the body.

In accordance with a second exemplary aspect, a fluid flow control device is provided. The fluid flow control device includes a valve body defining an inlet, an outlet, and a fluid flow passageway extending between the inlet and the outlet. The fluid flow control device includes a valve seat disposed in the fluid flow passageway and defining a seating surface, and a control element movably disposed in the valve body relative to the seating surface to control fluid flow through the fluid flow passageway. The seating surface is oriented along a seating axis. The fluid flow control device also includes an end connector coupled to the valve body, the end connector including a body and a cross-hole formed through at least a portion of the body. The cross-hole extends along an axis that is offset from the seating axis. The cross-hole is adapted to carry fluid between the fluid flow passageway and a fluid pipeline coupled to the fluid flow control device.

In accordance with a third exemplary aspect, a fluid flow control device is provided that is adapted to be coupled to an upstream pipeline and a downstream pipeline. The fluid flow control device includes a valve body, a valve seat, a control element, and first and second end connectors. The valve body defines an inlet, an outlet, and a fluid flow passageway extending between the inlet and the outlet. The valve seat is disposed in the fluid flow passageway and defines a seating surface, the seating surface oriented along a seating axis. The control element is movably disposed in the valve body relative to the seating surface to control fluid flow through the fluid flow passageway. The first end connector is coupled to the inlet of the valve body and includes a first body and a first cross-hole formed through at least a portion of the first body. The first cross-hole is centered about a first axis that is offset from the seating axis, the first cross-hole adapted to carry fluid between the upstream pipeline and the inlet of the valve body. The second end connector is coupled to the outlet of the valve body and includes a second body and a second cross-hole formed through at least a portion of the second body. The second cross-hole is centered about a second axis that is offset from the seating axis and the first axis, the second cross-hole adapted to carry fluid between the outlet of the valve body and the downstream pipeline.

In further accordance with any one or more of the foregoing exemplary aspects, an end connector and/or fluid flow control device may include any one or more of the following preferred forms.

In one preferred form, the cross-hole has a diameter equal to less 50% of a diameter of the body.

In another preferred form, a substantial portion of the cross-hole is closer to a first subset of the plurality of bolt holes than a second subset of the plurality of bolt holes.

In another preferred form, a port is formed through at least a portion of the body. The port is adapted to fluidly couple the cross-hole with the fluid pipeline. The port can be centered about the central axis of the body.

In another preferred form, the axis is oriented at an angle from the central axis of the body.

In another preferred form, the end connector is reconfigurable between a first position, in which the end connector is coupled to the valve body proximate to the inlet, and a second position, in which the end connector is coupled to the valve body proximate to the outlet.

In another preferred form, the second position is 180 degrees from the first position.

In another preferred form, the end connector further includes a plurality of bolt holes formed through the body, and the end connector is coupled to the valve body via a plurality of bolts disposed in the plurality of bolt holes, respectively.

In another preferred form, the port is centered about a port axis that is substantially parallel with the seating axis.

In another preferred form, the axis is oriented at an angle relative to the seating axis.

In another preferred form, the first cross-hole has a first diameter equal to less than 50% of a diameter of the first body, and the second cross-hole equal to less than 50% of a diameter of the second body. The first and second diameters can be substantially equal.

In another preferred form, the first end connector includes a plurality of first bolt holes formed through the body, the first end connector removably coupled to the inlet of the valve body via a plurality of first bolts disposed in the plurality of first bolt holes, respectively, and the second end connector includes a plurality of second bolt holes formed through the body, the second end connector removably coupled to the outlet of the valve body via a plurality of second bolts disposed in the plurality of second bolt holes, respectively.

In another preferred form, a first port is formed through at least a portion of the first body and adapted to fluidly couple the first cross-hole with the upstream pipeline, and a second port is formed through at least a portion of the second body and adapted to fluidly couple the second cross-hole with the downstream pipeline.

In another preferred form, the first and second ports are centered about a port axis that is substantially parallel with the seating axis.

DETAILED DESCRIPTION

As discussed above, identical end connectors 100 are typically utilized to connect an inlet and an outlet of a fluid flow control device to upstream and downstream pipelines, respectively, in a manner that centers cross-holes of the end connectors 100 and fluid ports of the end connectors 100 about a common axis. While this approach may simplify manufacturing and assembly, centering the cross-holes and fluid ports in this manner necessarily increases the sealing diameter for the end connectors 100. This, in turn, creates unnecessary additional axial forces on the end connectors 100 when in operation. To compensate for these additional axial forces, stronger end connectors 100, more mounting bolts, and/or larger mounting bolts must be employed, thereby increasing the cost of manufacture and assembly, particularly when the fluid flow control device is employed in large flow and/or high pressure applications.

The present disclosure is thus directed to an end connector that addresses the problems associated with such an approach, but does so in a manner that does not complicate manufacture and assembly. The end connector of the present disclosure features a cross-hole that is not centrally located, but is instead centered about an axis offset from a central axis of the body (about which the plurality of bolt holes are circumferentially arranged), such that the sealing diameter of the end connector can be minimized. The end connector of the present disclosure is also reconfigurable between an inlet configuration, whereby the end connector can be used as an inlet end connector and coupled to an inlet of a fluid flow control device, and an outlet configuration, whereby the end connector can be used as an outlet end connector and coupled to an outlet of the fluid flow control device, simply by rotating the end connector (e.g., by 180 degrees).

FIGS. 2A, 2B, 3A, and 3B illustrate an example of an end connector 200 constructed in accordance with the principles of the present disclosure. The end connector 200 illustrated herein takes the form of an end flange that can be removably coupled to an inlet side of a fluid flow control device (when the end connector 200 is arranged in an inlet configuration, shown in FIGS. 2A and 2B) or an outlet side of the fluid flow control device (when the end connector 200 is arranged in an outlet configuration, shown in FIGS. 3A and 3B). In other examples, the end connector 200 can take the form of a butt end weld connector, a grayloc hub connector, or some other end connector. While the end connector 200 illustrated in FIGS. 2A, 2B, 3A, and 3B includes a body 204, a plurality of bolt holes 208 formed through the body, a cross-hole 212, and a fluid port 216, the end connector 200 can, in other examples, include more, less, or different components. As an example, the end connector 200 need not include the fluid port 216, which can instead be coupled to the end connector.

The body 204 is generally defined by a substantially annular first surface 220, a substantially annular second surface 224 arranged opposite the first surface 220, and a substantially annular perimeter 228 arranged between the first and second surfaces 220, 224. The body 204 also includes an annular wall 230 that extends outward from (and of) the first surface 220 (in a direction away from the second surface 224), and an annular seating surface 232 that extends outward from the second surface 224 (in a direction away from the first surface 220). The perimeter 228 includes two opposing curved edges 236, 238, and two opposing flat edges 240, 242 that are shorter than the two opposing curved edges 236, 238. As illustrated, the perimeter 228 has a diameter that is larger than a diameter of the annular wall 230.

The bolt holes 208 are generally sized to receive a plurality of bolts, respectively, to couple the body 204 of the end connector 200 to the fluid flow control device. The bolt holes 208 are circumferentially arranged around a central axis 244 of the body 204 of the end connector 200, as best illustrated in FIGS. 2B and 3B. The bolt holes 208 are, in this example, arranged immediately proximate to the perimeter 228. In this example, the end connector 200 includes eight bolt holes 208, with four bolt holes 208 arranged in one half of the body 204 (e.g., immediately proximate the curved edge 236), and the remaining four bolts 208 arranged in the other half of the body 204 (e.g., immediately proximate to the curved edge 238). In other examples, however, the end connector 200 can include more or less bolt holes 208 and/or the bolt holes 208 can be arranged in a different manner.

The cross-hole 212 is generally formed through at least a portion of the body 204. The cross-hole 212 in the illustrated example is formed, and extends, through only a portion of the body 204. The cross-hole 212 has a first end 248 positioned between the first and second surfaces 220, 224, and a second end 252 located at the outer extent of the annular sealing surface 230. As best illustrated in FIGS. 2B and 3B, the cross-hole 212 also includes a passageway 254 that extends between the first and second ends 248, 252. The passageway 254 in this example is curved, or sloped, between the first and second ends 248, 252, with the passageway 254 sloping downward, from the first end 248 to the second end 252, when the end connector 200 is in the inlet configuration (FIGS. 2A and 2B), and the passageway 254 sloping upward, from the first end 248 to the second end 252, when the end connector 200 is in the outlet configuration (FIGS. 3A and 3B). The passageway 254 in this example is defined by a first wall 255 and a second wall 257 opposite the first wall 255. As illustrated, the first wall 255 is a single curved surface, while the second wall 257 includes a pair of surfaces that are angled relative to one another and converge at a point between the first and second ends 248, 252. In other examples, the cross-hole 212 can extend completely through the body 204 and/or the passageway 254 can be shaped and/or defined differently (e.g., curve in a different direction, be substantially straight).

Unlike the cross-hole 104 of the end connector 100, the cross-hole 212 is offset from a central portion of the body 204. More particularly, the cross-hole 212 is centered about an axis 256 or 260 (depending upon the configuration of the connector 200) that is offset from and angled relative to the central axis 244, such that the second end 252 of the cross-hole 212 is closer to a first subset of the plurality of bolt holes 208 than a second subset of the plurality of bolt holes 208. In this example, the axis 256 or 260 about which the cross-hole 212 is centered is oriented at an angle of approximately 30 degrees relative to the central axis 244, but in other examples, the axis can be oriented at a different angle (e.g., 15 degrees, 45 degrees, etc.). In this example, the second end 252 of the cross-hole 212 is closer to the curved edge 236 and the bolt holes 208 arranged immediately proximate to the curved edge 236, though the second end 252 of the cross-hole 212 can instead be arranged closer to the curved edge 238 (when, for example, the passageway 254 curves in an opposite manner). When the end connector 200 is in the inlet configuration shown in FIGS. 2A and 2B, the cross-hole 212 is centered about the axis 256 that is offset from and angled relative to the central axis 244, but when the end connector 200 is in the outlet configuration shown in FIGS. 3A and 3B, the cross-hole 212 is centered about the axis 260 that is offset from and angled relative to the central axis 244 (and, when viewed in FIG. 3B, located above the axis 256). The cross-hole 212 also has a diameter that is smaller than a diameter of any portion of the body 204, particularly the diameter of the perimeter 228 of the body 204. The diameter of the cross-hole 212 may, for example, be less than 50%, 40%, 30%, or 25% of the diameter of the perimeter 228 of the body 204. In the illustrated example, the diameter of the cross-hole 212 is equal to approximately 1.5 inches (38.1 mm), and the diameter of the perimeter 228 of the body 204, measured from edge 236 to edge 238, is equal to approximately 4.645 inches (118 mm). In other examples, the diameter of the cross-hole 212 can be greater or less than 1.5 inches and/or the diameter of the perimeter 228 can be greater or less than 4.645 inches.

The fluid port 216, which, in this example, takes the form of an NPT or SAE port, is, like the cross-hole 212, generally formed through (e.g., machined into) at least a portion of the body 204. Unlike the cross-hole 212, however, the fluid port 216 is centered about the central axis 244. The fluid port 216 in the illustrated example is formed and extends through only a portion of the body 204. More specifically, the fluid port 216 has a first end 264 located at the outer extent of the annular wall 230, and a second end 268 positioned between the first and second surfaces 220, 224. The fluid port 216 also includes a passageway 272 that extends between the first and second ends 264, 268. The passageway 272 in this example is defined by a pair of opposing walls 273 each including a first surface 275 and a second surface 277, each first surface 275 being angled relative to the central axis 244, and each second surface 277 extending in a direction parallel to the central axis 244. In other examples, the fluid port 216 can have a different size and/or shape.

As illustrated in FIGS. 2B and 3B, the second end 268 of the fluid port 216 is immediately adjacent, and in fluid communication with, the first end 248 of the cross-hole 212, such that the passageway 272 (and more generally the fluid port 216) is in fluid communication with the passageway 254 (and more generally the cross-hole 212). The cross-hole 212 and the fluid port 216 thus facilitate fluid flow between the fluid flow control device and a pipeline arranged upstream or downstream of the fluid flow control device. When the end connector 200 is arranged in the inlet configuration shown in FIGS. 2A and 2B, and coupled to the inlet side of the fluid flow control device, the cross-hole 212 and the fluid port 216 facilitate fluid flow between the fluid flow control device and an upstream pipeline. Conversely, when the end connector 200 is arranged in the outlet configuration shown in FIGS. 3A and 3B, and coupled to the outlet side of the fluid flow control device, the cross-hole 212 and the fluid port 216 facilitate fluid flow between the fluid flow control device and a downstream pipeline.

Figure 4:
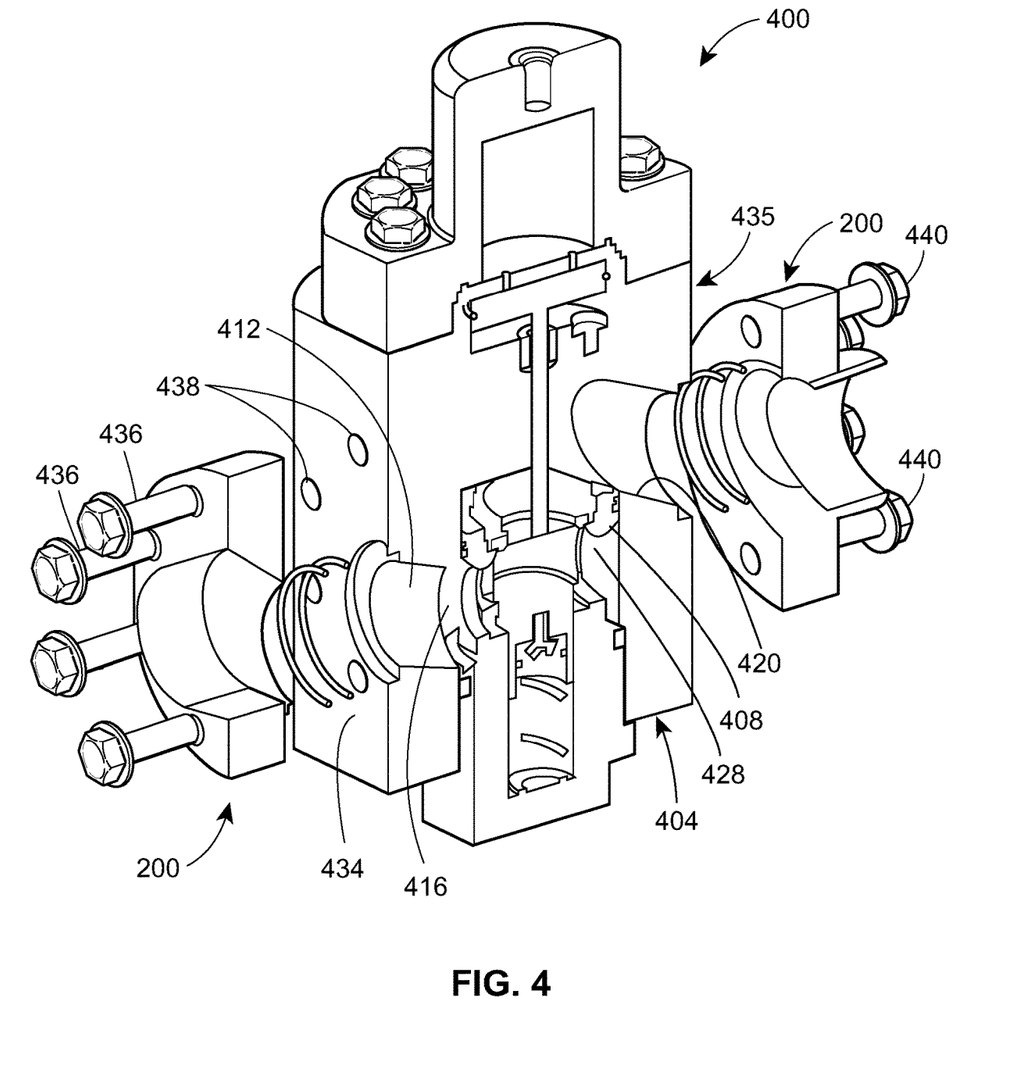
FIG. 4 illustrates a pair of end connectors being coupled to one example of a fluid flow control device constructed in accordance with the teachings of the present disclosure.

FIG. 4 illustrates the process of removably coupling a pair of end connectors 200 to one example of a fluid flow control device 400 constructed in accordance with the principles of the present disclosure. The fluid flow control device 400 generally includes, in relevant part, a valve body 404, a valve seat 408, and a control element 412. The valve body 404 defines an inlet 416, an outlet 420, and a fluid flow passageway 424 (see FIG. 5) that extends between the inlet 416 and the outlet 420. As illustrated, the inlet 416 has a shape that matches or corresponds to the shape of the passageway 254 when the end connector 200 is in the inlet configuration, and the outlet 420 has a shape that matches or corresponds to the shape of the passageway 254 when the end connector 200 is in the outlet configuration. The valve seat 408 is disposed in the fluid flow passageway 424 and defines a seating surface 428 that in turn defines a seating axis 432. The control element 412 in this example takes the form of a valve plug movably disposed in the valve body 404 relative to the seating surface 428 to control fluid flow through the fluid flow passageway 424. The fluid flow control device 400 may also include a number of other components, e.g., a sensing cavity, a piston, a baffle plate, one or more stems, that are not essential to the present disclosure and, as a result, are not described herein. Further details regarding those components are described in commonly owned U.S. patent application Ser. No. 15/199,137, entitled "Piston Sensor with Baffle Plate" (Ref. No.: 06005/823572), which is hereby expressly incorporated herein for all uses and purposes.

Figure 2A:
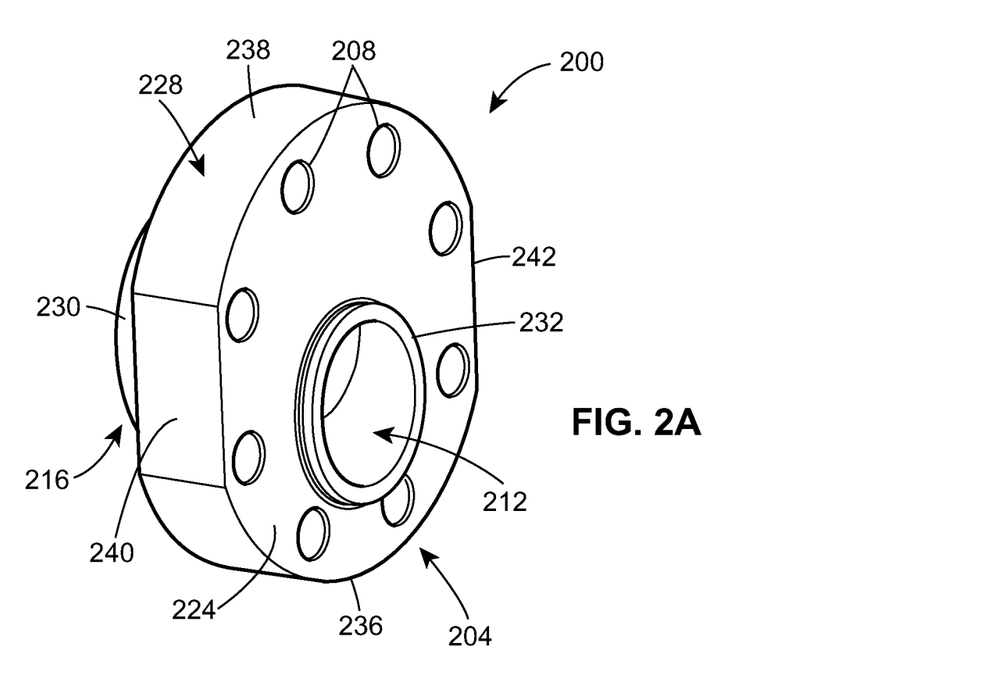
FIG. 2A is a perspective view of one example of an end connector constructed in accordance with the teachings of the present disclosure, showing the end connector in an inlet configuration.
Figure 2B:
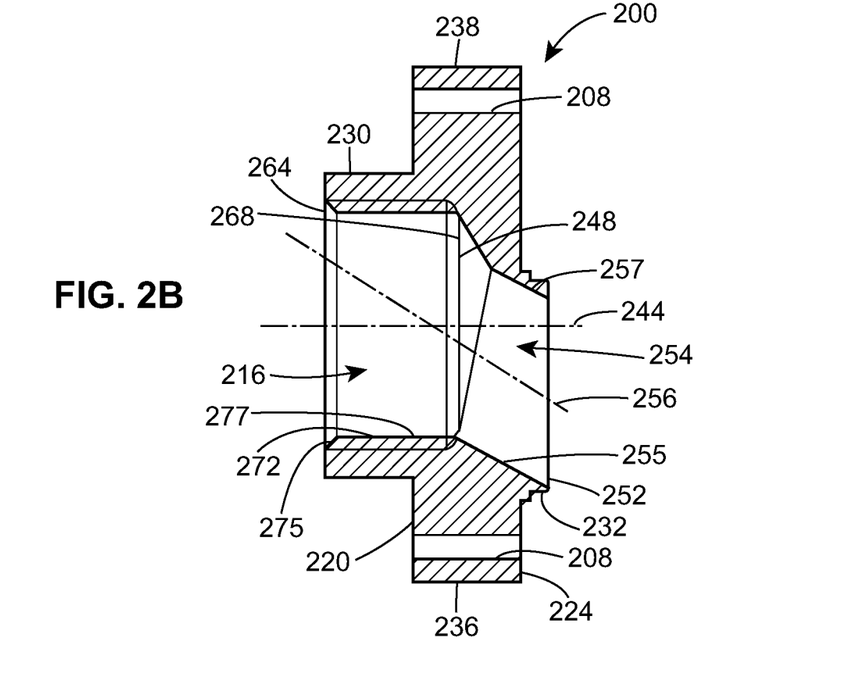
FIG. 2B is a cross-sectional view of the end connector of FIG. 2A.
Figure 3A:
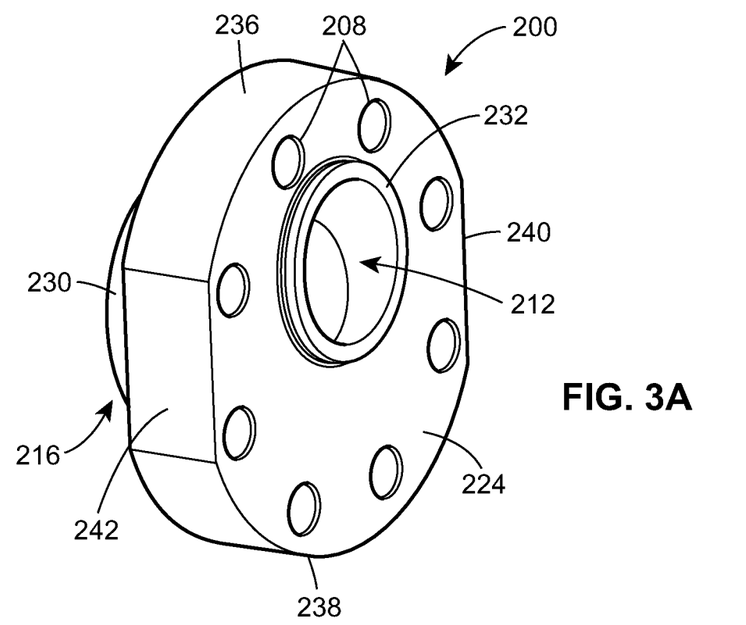
FIG. 3A is a perspective view of the end connector of FIG. 2A, but showing the end connector in an outlet configuration.
Figure 3B:
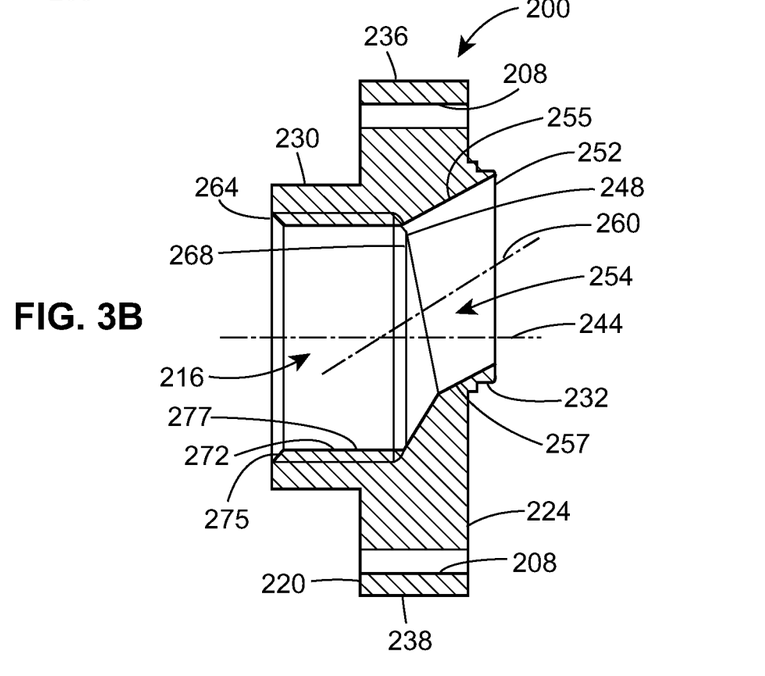
FIG. 3B is a cross-sectional view of the end connector of FIG. 3A.

As illustrated in FIG. 4, a first of the pair of end connectors 200 is in the inlet configuration shown in FIGS. 2A and 2B and, as such, can be coupled to the inlet 416 of the valve body 404. The first end connector 200, which can also be referred to as the inlet end connector, can be coupled to the valve body 404 by (i) positioning the second surface 224 of the body 204 of the first end connector 200 against or in contact with a first external surface 434 of the valve body 404, and (ii) seating or disposing a plurality of bolts 436 in the plurality of bolt holes 208, respectively, of the first end connector 200, and a plurality of bolt holes 438, respectively, formed in the valve body 404 proximate to the inlet 416. As also illustrated in FIG. 4, a second of the pair of end connectors 200 is in the outlet configuration shown in FIGS. 3A and 3B, and, as such, can be coupled to the outlet 420 of the valve body 404. Like the first end connector 200, the second end connector 200, which can also be referred to as the outlet end connector, can be coupled to the valve body 404 by (i) positioning the second surface 224 of the body 204 of the second end connector 200 against or in contact with a second external surface 435 of the valve body 404, and (ii) seating or disposing a plurality of bolts 440 in the plurality of bolts 208, respectively, of the second end connector 200, and a plurality of bolt holes, respectively, formed in the valve body 404 proximate to the outlet 420 (not shown).

Figure 5:
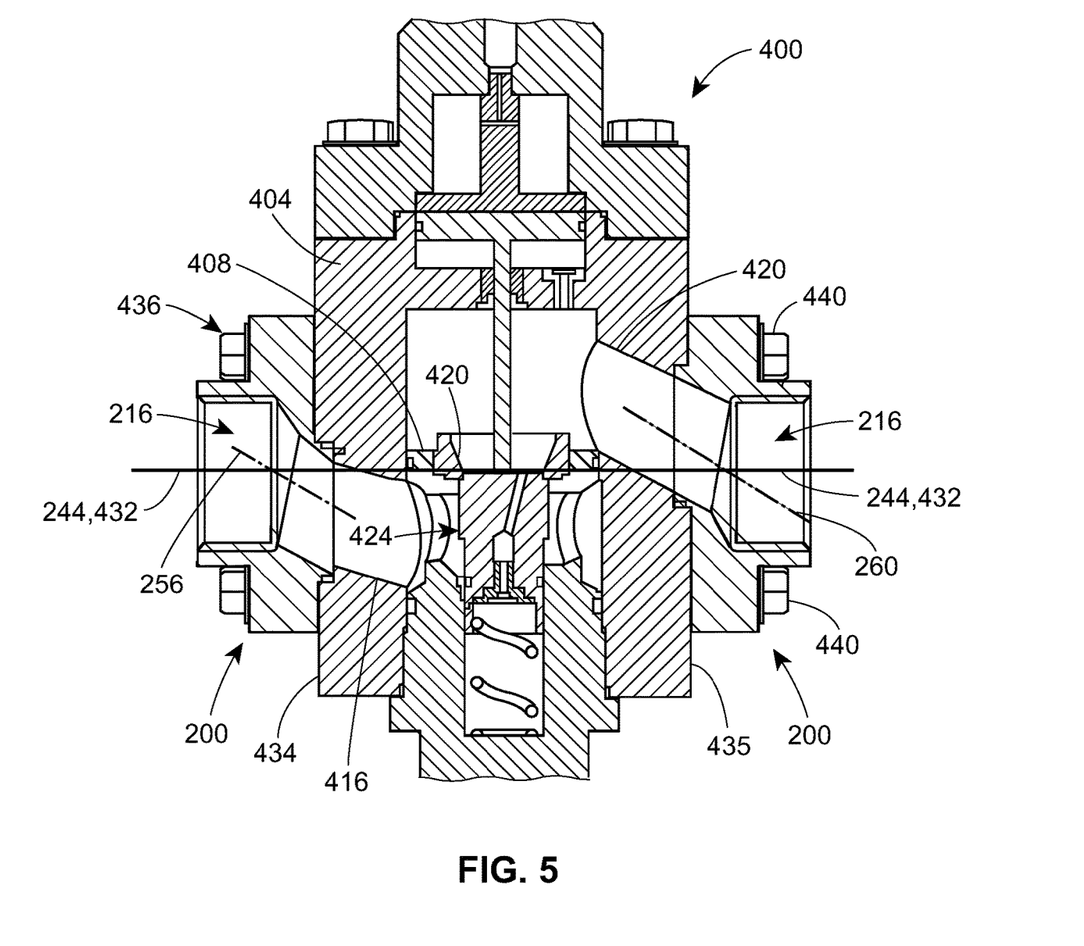
FIG. 5 illustrates the pair of end connectors coupled to the fluid flow control device of FIG. 4.

FIG. 5 illustrates the inlet and outlet end connectors 200 coupled to the fluid flow control device 400 in the manner described in connection with FIG. 4. When the inlet and outlet end connectors 200 are coupled in this manner, the fluid ports 216 of the inlet and outlet end connectors 200, which are located about the central axis 244, are aligned or co-axial with the axis 432, while the cross-holes 212 of the of the inlet and outlet end connectors 200, which are offset from the fluid ports 216, are offset from the axis 432. Such a configuration allows the sealing diameter of each of the end connectors 200 (i.e., the diameter of the sealing surfaces 232, the diameter of the cross-holes 212) to be smaller than the sealing diameter of each of the conventional end connectors 100, as the sealing diameter of each end connector 200 only needs to be large enough to accommodate the minimum desired process flow stream diameter size. As an example, the sealing diameter of each of the end connectors 200 can be equal to approximately 1.5 inches, as opposed to the 2.77 inches utilized in the conventional end connectors 100. As a result, the end connectors 200 are constructed in a way that reduces the unnecessary additional axial forces described above, which in turn obviates the need for costly additional measures to compensate for these unnecessary additional axial forces.

While not illustrated herein, it will be appreciated that the inlet and outlet end connectors 200 can be used to fluidly couple the fluid flow control device 400 to upstream and downstream fluid pipelines, respectively, which in turn fluidly couple the fluid flow control device 400 to other components of a process control system. In operation, fluid can flow between the upstream fluid pipeline and the fluid flow control device 400 via the inlet end connector 200, while fluid can flow between the downstream fluid pipeline and the fluid flow control device 400 via the outlet end connector 200. Finally, while the inlet and outlet end connectors 200 are described in connection with the fluid flow control device 400, it will be appreciated that one or more of the end connectors 200 can be employed in connection with a different fluid flow control device.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. An end connector for connecting a fluid pipeline to a fluid flow control device, the end connector comprising:
   a body comprising a flange having first and second surfaces, an annular wall extending outward from the first surface of the flange, and a seating surface extending outward from the second surface of the flange, the seating surface adapted to engage an external surface of the fluid flow control device;
   a plurality of bolt holes formed through the first and second surfaces of the flange and adapted to receive a plurality of bolts, respectively, to couple the body to the fluid flow control device, the plurality of bolt holes circumferentially arranged around a central axis of the body;
   a cross-hole formed through at least a portion of the body and adapted to carry fluid between the fluid pipeline and the fluid flow control device, the cross-hole extending between a first end located between the first and second surfaces of the flange and a second end defined by the seating surface, the cross-hole centered entirely about a first axis offset from the central axis of the body; and
   a port formed through at least a portion of the body and adapted to fluidly couple the cross-hole with the fluid pipeline, the port extending between a third end located between the first and second surfaces of the flange and a fourth end defined by the annular wall, the port centered entirely about a second axis that is coaxial with or parallel to the central axis of the body, such that the port is angled relative to the cross-hole.

2. The end connector of claim 1, wherein the cross-hole has a diameter equal to less 50% of a diameter of the body.

3. The end connector of claim 1, wherein a substantial portion of the cross-hole is closer to a first subset of the plurality of bolt holes than a second subset of the plurality of bolt holes.

4. The end connector of claim 1, wherein the first axis is oriented at an angle from the central axis of the body.

5. The end connector of claim 1, wherein the annular wall has a first length extending along the central axis of the body and the seating surface has a second length extending along the central axis of the body, the second length being less than the first length.

6. The end connector of claim 1, wherein the second axis is coaxial with the central axis of the body.

7. A fluid flow control device, comprising:
a valve body defining an inlet, an outlet, and a fluid flow passageway extending between the inlet and the outlet;
a valve seat disposed in the fluid flow passageway and defining a first seating surface, the first seating surface oriented along a seating axis;
a control element movably disposed in the valve body relative to the first seating surface to control fluid flow through the fluid flow passageway; and
an end connector coupled to the valve body, the end connector comprising a body and a cross-hole formed through at least a portion of the body, the body comprising a flange having first and second surfaces, the body further comprising an annular wall extending outward from the first surface of the flange, and a second seating surface extending outward from the second surface of the flange and configured to engage an external surface of the valve body, the cross-hole extending between a first end located between the first and second surfaces of the flange and a second end defined by the second seating surface, the cross-hole centered entirely along a first axis that is offset from the seating axis, and the cross-hole adapted to carry fluid between the fluid flow passageway and a fluid pipeline coupled to the fluid flow control device,
wherein the end connector further comprises a port formed through at least a portion of the body and adapted to fluidly couple the cross-hole with the fluid pipeline, the port extending between a third end located between the first and second surfaces and a fourth end defined by the annular wall, the port centered entirely along a second axis that is coaxial with or parallel to the seating axis, such that the port is angled relative to the cross-hole.

8. The fluid flow control device of claim 7, wherein the end connector is reconfigurable between a first position, in which the end connector is coupled to the valve body proximate to the inlet, and a second position, in which the end connector is coupled to the valve body proximate to the outlet.

9. The fluid flow control device of claim 8, wherein the second position is 180 degrees from the first position.

10. The fluid flow control device of claim 7, wherein the end connector further comprises a plurality of bolt holes formed through the first and second surfaces of the flange of the body, and wherein the end connector is coupled to the valve body via a plurality of bolts disposed in the plurality of bolt holes, respectively.

11. The fluid flow control device of claim 10, wherein a substantial portion of the cross-hole is closer to a first subset of the plurality of bolt holes than a second subset of the plurality of bolt holes.

12. The fluid flow control device of claim 7, wherein the cross-hole has a diameter equal to less than 50% of a diameter of the body.

13. The fluid flow control device of claim 7, wherein the first axis is oriented at an angle relative to the seating axis.

14. The fluid flow control device of claim 7, wherein the annular wall has a first length extending along the central axis of the body and the seating surface has a second length extending along the central axis of the body, the second length being less than the first length.

15. The fluid flow control device of claim 7, wherein the second axis is parallel to the seating axis.

16. A fluid flow control device adapted to be coupled to an upstream pipeline and a downstream pipeline, the fluid flow control device comprising:
a valve body defining an inlet, an outlet, and a fluid flow passageway extending between the inlet and the outlet;
a valve seat disposed in the fluid flow passageway and defining a seating surface, the seating surface oriented along a seating axis;
a control element movably disposed in the valve body relative to the seating surface to control fluid flow through the fluid flow passageway;
a first end connector coupled to the inlet of the valve body, the first end connector comprising a first body and a first cross-hole formed through at least a portion of the first body, the first cross-hole entirely centered about a first axis that is offset from the seating axis, the first cross-hole adapted to carry fluid between the upstream pipeline and the inlet of the valve body; and
a second end connector coupled to the outlet of the valve body, the second end connector comprising a second body and a second cross-hole formed through at least a portion of the second body, the second cross-hole entirely centered about a second axis that is offset from the seating axis and the first axis, the second cross-hole adapted to carry fluid between the outlet of the valve body and the downstream pipeline,
wherein the first end connector further comprises a first port formed through at least a portion of the first body and adapted to fluidly couple the first cross-hole with the upstream pipeline, and wherein the first port is entirely centered about a first port axis that is coaxial with or parallel to the seating axis, such that the first port is angled relative to the first cross-hole.

17. The fluid flow control device of claim 16, wherein the first cross-hole has a first diameter equal to less than 50% of a diameter of the first body, and wherein the second cross-hole has a second diameter equal to less than 50% of a diameter of the second body, the first and second diameters being substantially equal.

18. The fluid flow control device of claim 16, wherein the first end connector comprises a plurality of first bolt holes formed through the body, the first end connector removably coupled to the inlet of the valve body via a plurality of first bolts disposed in the plurality of first bolt holes, respectively, and wherein the second end connector comprises a plurality of second bolt holes formed through the body, the second end connector removably coupled to the outlet of the valve body via a plurality of second bolts disposed in the plurality of second bolt holes, respectively.

19. The fluid flow control device of claim 16, further comprising a second port formed through at least a portion of the second body and adapted to fluidly couple the second cross-hole with the downstream pipeline.

20. The fluid flow control device of claim 19, wherein the second port is centered about a second port axis that is substantially parallel to or coaxial with the seating axis.

\* \* \* \* \*

UNITED STATES PATENT AND TRADEMARK OFFICE
CERTIFICATE OF CORRECTION

PATENT NO. : 10,704,716 B2
APPLICATION NO. : 15/199747
DATED : July 7, 2020
INVENTOR(S) : Jacob T. R. Renollett It is certified that error appears in the above-identified patent and that said Letters Patent is hereby corrected as shown below:

In the Specification

Column 5, Line 25, "annular sealing surface 230." should be -- annular seating surface 232. --.

Column 7, Line 40, "plurality of bolts 208," should be -- plurality of bolt holes 208, --.

Column 7, Lines 50-51, "of the of the" should be -- of the --.

Column 7, Lines 54-55, "sealing surfaces 232," should be -- seating surfaces 232, --.

Signed and Sealed this
Twenty-seventh Day of August, 2024

Katherine Kelly Vidal
*Director of the United States Patent and Trademark Office*